3,689,447
PROCESS FOR PREPARING EMULSION INTERPOLYMERS CONTAINING VINYL CHLORIDE AND ETHYLENE, HAVING IMPROVED HEAT STABILITY
Samuel J. Makower, 1492 Wister Drive, Wyncote, Pa. 19095, and Philip A. Cautilli, 2012 Shady Brook Lane, Feasterville, Pa. 19047
No Drawing. Filed June 8, 1970, Ser. No. 44,634
Int. Cl. C08f 1/03, 15/02
U.S. Cl. 260—29.6 RB    10 Claims

ABSTRACT OF THE DISCLOSURE

This invention relates to heat resistant interpolymers containing 6–30% ethylene and 94–70% of comonomer comprising a major portion of vinyl chloride. Latexes of said interpolymers, mechanically stable at high solids, are made by gradually adding said comonomer to an aqueous composition maintained under ethylene pressure not higher than 3,000 p.s.i., at a temperature between about 50° C. and 85° C. and containing a seed latex and a thermally activated initiator selected from the group consisting of water-soluble persulfates and peroxydiphosphates.

BACKGROUND OF THE INVENTION

Interpolymers containing vinyl chloride and ethylene, particularly in the form of fine-particle aqueous dispersions commonly called latexes, are useful as film-forming components of adhesives and various coatings such as paints and coatings for paper, textiles and the like. The desired film-forming characteristics are obtained when between about 6% and 30% by weight of ethylene is incorporated in said interpolymers.

The prior art conventionally aims to increase the amount of copolymerized ethylene by increasing the pressure on the aqueous composition used in making the latex. Ethylene pressures substantially higher than 3,000 p.s.i. and reaction temperatures lower than 50° C. are conventionally used. Since thermally activated initiator systems do not perform satisfactorily at such low temperatures, redox initiators and promoters are therefore used which have the disadvantages that the resultant interpolymer tends to discolor and decompose on heating and/or storage.

Another disadvantage of prior art methods is that large excesses of comonomer must be added in order to obtain latexes with respectable amounts of solids. Thus, in the case of vinyl chloride/ethylene copolymer latexes, the earlier methods require addition of vinyl chloride in such excess that about 35% to 40% of the charged vinyl chloride monomer remains unreacted at the termination of a polymerization run. Furthermore, unless the solids content is limited to about 30–35%, it is extremely difficult to control the procedure so as to attain colloid stability unless excessive amounts of surfactant are used.

SUMMARY OF THE INVENTION

A method has now been found for preparing stable high-solids latexes of vinyl chloride/ethylene interpolymers which are heat-resistant and discoloration-resistant. It has been discovered that the use of a seed latex in the aqueous composition for emulsion polymerization, together with heat-activated initiation at between about 50 and 85° C. by persulfates or peroxydiphosphates eliminates the long periods of induction and surprisingly permits the use of lower pressures than conventionally used to incorporate a desired amount of ethylene.

Under the conditions of carrying out the method of this invention, considerably lower amounts of ethylene are charged to the reaction vessel than when the conventionally higher pressures and lower temperatures are used. Yet paradoxically, in spite of the apparently lower availability of ethylene in the reaction vessel, equal and even higher amounts of ethylene are incorporated in the polymer.

The method of this invention thus makes more efficient use of the charged ethylene, and it also makes more efficient use of the charged comonomers. Thus, 85% or more of the charged comonomer can be reacted.

With the method of this invention it is possible to attain latexes of high solids content which are colloidally stable. Illustratively, the solids content can be at least 40%, for example from about 47% up to 66% or more, and suitably between about 50% and 54%. Latexes of low solids content are, of course, also preparable by the method of this invention with the aforesaid advantages of higher monomer conversion, higher incorporation of ethylene and high resistance of polymer to heat.

Briefly stated, the method of this invention comprises maintaining ethylene pressure at a level selected from the range from about 500 p.s.i. up to less than about 3,000 p.s.i., at a temperature between about 50° C. and 85° C., on an aqueous composition containing a seed latex and an initiator selected from the group consisting of water-soluble persulfates and peroxydiphosphates, said initiator being maintained at a level sufficient to effect polymerization while adding gradually over a period of not less than about six hours the comonomers comprising a major proportion of vinyl chloride and optional supplementary ethylenically unsaturated monomers.

DETAILED DESCRIPTION

Advantages of this invention are gained in the method of processing, in the properties and usefulness of the latex product obtained thereby and in the application of the product as a film-forming component of coatings and adhesives.

The advantages in regard to processing consist partly in that the method of this invention operates at conveniently lower pressures than conventionally used. Also it is possible to charge larger total amounts of the monomers and to convert a larger fraction of these monomers into polymer. The method of this invention also has the advantage that reaction of the monomers commences substantially without inhibition, in strong contrast to the extended induction periods that are often encountered in the methods of the prior art.

The advantages in regard to the resulting latex are increased solids content and excellent mechanical stability and resistance to coagulation in spite of the higher solids content. The higher solids content is an advantage in many types of formulation into adhesives or coatings as when other components are introduced as aqueous solutions or dispersions and it is desirable not to over-dilute.

As to the advantages in application of the latex of this invention, the films deposited by said latex have high clarity with substantially greater resistance to discoloration on exposure to heat than interpolymers of the same composition made by the method of the prior art.

An essential feature contributing to the effectiveness of the present invention in achieving the above-described advantages is the presence of a seed latex in the aqueous composition in which the copolymerization of this invention takes place. Said seed latex can be prepared by the emulsion polymerization of any polymerizable ethylenically unsaturated compound. Thus, the polymer of the seed latex can be a homopolymer or interpolymer of a monomer or monomers such as vinyl chloride; vinyl acetate; vinyl propionate; alkyl acrylates or methacrylates having from 1–10 carbon atoms in the alkyl group, e.g. methyl acrylate, methylmethacrylate, butyl acrylate, isopropylacrylate; 2-ethylhexyl acrylate, decyl methacrylate, and the like. Illustratively, the polymer of the seed latex can be polyvinyl chloride; poly (methylmethacrylate); polyvinyl acetate; poly (2-ethyl-hexylacrylate); polyethylene; a copolymer of vinyl chloride and ethylene; a copolymer of vinyl chloride and isoprene; a copolymer of vinyl chloride with 99–1% of one of the other ethylenically unsaturated compounds, for example methyl acrylate; various interpolymers of copolymerizable ethylenically unsaturated compounds, and the like.

In preparation of the seed latex the initiators, buffers, and emulsion stabilizers including surfactants and protective colloid polymers, can be selected from the same respective substances described further below as being appropriate in making the product latex of this invention. The seed latex can be prepared beforehand in a separate vessel and a desired aliquot can then be introduced into the aqueous composition of this invention. Alternatively, the seed latex can be made in situ in all or part of said aqueous composition before the reactor is pressurized with ethylene.

The size of the seed particles can be between about 0.005 and 0.10 micron. The inventors have found that seeds with average particle size between about 0.01 and 0.05 micron are particularly suitable. The size of the seed particles can be controlled by methods well-known to those trained in the art of emulsion polymerization. As to the weight ratio of seed solids to total liquid monomers charged, this can be between 0.01% up to about 10%, it being preferred to have this ratio between about 0.1% and 5%, more particularly between about 0.5% and 3%.

When a surfactant is used in preparing the seed, this can be in amount from about 0.04% up to about 5% by weight of the seed latex solids. Amounts of between about 0.5% and 2% on seed solids are suitable; in particular between about 0.5% and 1.0% are preferred.

A second feature of this invention is the use of lower pressures than are conventionally used to incorporate a desired amount of ethylene into an interpolymer with vinyl chloride even though the temperatures used are higher than usual. Thus, for example, in the case of vinylchloride/ethylene copolymer, in order to incorporate 18% ethylene, a temperature of 63° C. together with a pressure of 1,200 p.s.i. can be used in contrast to the practice of the prior art which typically uses temperatures around about 30° C. and pressures of about 3,500 p.s.i. The amounts of ethylene which are charged under the conditions of the present invention are considerably less than under the conditions which are used by prior practice to incorporate the same amount of ethylene into the copolymer.

A third feature of this invention is the use of persulfate or peroxydiphosphate initiators in the absence of reducing agents and at temperatures between about 50° C. and 85° C. In the interest of avoiding reducing agents, even the seed latex can be prepared without such agents. However, it is also possible to use a redox system in preparing the seed latex, care being taken that only negligible amounts of reducing agents remain after the seed latex is formed i.e. substantially no reducing agents or promoters are introduced into the aqueous composition used to prepare the ethylene interpolymer of this invention.

The persulfate or peroxydiphosphate initiator of this invention can be supplied as any salt containing either or both of these anions sufficiently soluble in water to maintain a satisfactory rate of interpolymerization under the conditions use. Thus, for example, it can be selected from the alkali metal salts or ammonium or substituted ammonium salts, particular examples being sodium persulfate $Na_2S_2O_8$, potassium persulfate, ammonium persulfate, potassium peroxydiphosphate $K_4P_2O_8$, sodium peroxydiphosphate, ammonium peroxydiphosphate, ethyl ammonium persulfate, methyl ethyl ammonium persulfate, tetramethylammonium persulfate or lithium peroxydiphosphate.

The initiator can be supplied by various methods to the aqueous composition in the emulsion polymerization of this invention. Thus for example, the entire amount of initiator used can be added at the start of reaction, or an initial portion can be followed by gradual or portionwise addition of the remainder during the course of reaction, or the entire amount can be added gradually as an aqueous solution throughout the reaction period. The amounts to be used will depend upon the rate of polymerization desired, and can vary between about 0.1% and 5% of the weight of the aqueous composition, especially from 0.2% to 2%.

As to temperature, benefits of this invention are obtained over the range between about 50° C. and 85° C. The lower threshold is limited by the requirements for the heat-activation of the persulfate or peroxydiphosphate initiator. On the other hand, temperatures substantially above 85° C. are conducive to coloration of the product polymer.

For the most favorable results both with regard to enhancing the incorporation of ethylene and also with regard to obtaining high resistance to yellowing, the inventors prefer temperatures between about 55° C. and 70° C.

The pressure chosen for the process of this invention will depend upon the ethylene content desired in the polymer. Thus, in the case of ethylene and vinyl chloride copolymerized at 60° C., the amount of incorporated ethylene ranges from about 6% to about 30% of total copolymer as the pressure is changed from about 500 p.s.i. to less than about 3,000 p.s.i. When working at temperatures between about 55° C. and 70° C., to obtain copolymers with between about 15% and 20% ethylene, pressures between about 1,200 and 1,500 p.s.i. are used.

The method of this invention will be illustrated chiefly as a means of copolymerizing vinyl chloride and ethylene. However, up to 49% of the vinyl chloride can be replaced by supplemental olefinically unsaturated coreactive comonomers. Suitably between about 15% and 25% of the vinyl chloride is thus replaced. Examples of such comonomers include vinyl esters such as vinyl acetate, and vinyl propionate; olefins such as propylene, butene and the like; vinylidene chloride; and esters of acrylic or methacrylic acid with alkanols containing up to ten carbon atoms in the alkyl group. Illustrative of such esters are methyl acrylate, ethyl acrylate, butyl acrylate, isopropyl methacrylate, and 2-ethylhexylacrylate, decyl acrylate, methyl methacrylate, and the like.

In addition, a functional comonomer can be included in small amounts, up to about 10% of the total interpolymer, and preferably up to about 4%. Illustrative of such functional comonomers are the vinyl esters of polybasic acids such as divinyl adipate, divinyl succinate, and divinyl itaconate; allyl esters of polyfunctional acids such as diallyl fumarate, triallyl cyanurate, and diallyl vinyl citrate; unsaturated ethers such as divinyl ether and diallyl ether; and compounds such as glycidyl acrylate, glycidyl methacrylate, glycidyl vinyl ether, and glycidyl allyl ether.

A condition of the method of this invention is that the addition of the comonomers is extended over a period of at least six hours. Up to about one-fifth of said comonomers can be added at the beginning of a polymerization run. The remainder of the monomers is then added over the extended period of time, making such adjustments in relative addition rates to compensate for inequalities in reactivity ratios by procedures known to those familiar with the art of such interpolymerization.

For example, when vinyl chloride is the sole comonomer with ethylene, up to about one-fifth of the total amount of vinyl chloride charged to the reactor can be added in one initial portion. The remainder is then added gradually over the extended period of time. If the vinyl chloride is added at too rapid a rate, there is a tendency for the ratio of ethylene incorporated in the copolymer to be diminished. On the other hand, prolonged addition times are impractical. It is preferred to limit the vinyl chloride addition time to between about 10 and 18 hours, more preferably between about 12 and 16 hours. It is also preferred to maintain the ethylene pressure and the temperature substantially constant during the period of adding vinyl chloride so as to ensure a substantially constant ethylene content in the polymer formed at successive stages of the run.

The method of this invention can be used to make stable latexes of high solids content. Thus, in the case of vinyl chloride/ethylene copolymers, sufficient vinyl chloride can be added to reach a polymerized solids content of at least 40% solids with extremely good mechanical stability, the product latexes remaining stable on storage for periods in excess of one year. Illustratively such latexes can have a solids content of from 47% up to 66% or more. This is in marked contrast to the results obtained with methods of the prior art which are extremely difficult to control at high solids. Although latexes of 46% solids have been reported, such products of the prior art are rarely obtainable without coagulum and are not sufficiently stable mechanically to remain in storage for more than a few days before coagulating completely.

In the making of these high-solids latexes, the present method has further advantage over the prior art in that the charged comonomer comprising vinyl chloride need not be more than about 10% to 12% in excess over the comonomer to be copolymerized. At the end point of the reaction when the desired high-solids is attained, 85% or more of the charged comonomer can be reacted. Obviously, however, in applying the method of this invention, a latex of lower solids can be made, if desired, either by early termination of the comonomer addition or by early termination of the reaction or both.

The aqueous composition in the method of this invention can contain any of the anionic and nonionic surfactants customarily used in effecting emulsion polymerization. For example, there can be used sodium lauryl sulfate, sodium dodecyl benzene sulfonate, sodium alkylsulfosuccinates, alkyl esters of sodium sulfosuccinate, sodium or ammonium salts of sulfate esters of alkyl phenoxy poly (ethyleneoxy) ethanols such as octyl or nonyl phenoxy poly (ethyleneoxy) ethanols, including the full range of ethylene oxide contents available. The aqueous composition can also contain condensates of ethylene oxide with hydrophobic bases formed by condensing propylene oxide with propylene glycol.

As will be evident to those trained in the art of emulsion polymerization, various other types of surface active agents can be applied and also certain surfactants can be used in combination to obtain a particular balance of properties. As to amounts, surfactants can be used in the usual proportions well established in the art of emulsion polymerization, as from .04% to about 5% based on weight of aqueous composition and the particular amount and addition schedule being chosen such as to control particle size and eventual stability of the product latex. Ordinarily, concentrations between about .5% and 2.0% are preferred. Surfactants can be introduced into the aqueous composition initially or gradually during the period of simultaneous gradual addition of vinyl chloride, or after polymerization has been completed.

The aqueous composition of this invention can also contain a polymeric colloid stabilizer such as starch, gelatin, casein, hydroxyethyl cellulose, carboxymethyl cellulose, polyvinyl alcohol of both fully hydrolyzed and partially hydrolyzed grades, polyvinyl pyrrolidone and the like. The colloid stabilizer can be used in amount up to about 10% of the added comonomer, between about 1% and 5% being particularly suitable.

The aqueous composition of this invention can contain as a buffer any water-soluble compound capable of maintaining the pH between about 6 and 12, preferably between about 8 and 10. Examples of such compounds include alkali metal salts of carbonic acid, phosphoric acid, citric acid, and tartrate acid, as well as weak bases like ammonia or alkyl-substituted ammonia. Thus, there can be used sodium carbonate, sodium bicarbonate, ammonium carbonate, trisodium phosphate, sodium dihydrogen phosphate, disodium hydrogen phosphate, sodium citrate, sodium tartrate, potassium carbonate, potassium hydrogen phosphate, potassium tartrate, ammonium hydroxide or methylammonium hydroxide.

This invention will be further illustrated by description in connection with the following specific examples of the practice of it, wherein, as also elsewhere herein, proportions are in parts by weight unless stated otherwise, and wherein the values reported for the ethylene content of the resultant copolymers or interpolymers were obtained by direct quantitative elemental analysis. Unless stated otherwise, statements in this specification as to amounts added to the aqueous composition are expressed in percentage based upon the total weight of added comonomer comprising vinyl chloride.

Example 1

This example illustrates the preparation of a seed latex of polyvinyl chloride.

Using a pressure kettle equipped with stirrer and means for introducing reactants, 60.6 grams of sodium lauryl sulfate were dispersed in 11,550 grams of deionized water. There was then added 6060 grams of vinyl chloride monomer and 24.2 grams sodium persulfate. Polymerization was carried out at 40° C. to 60° C. accelerated by the gradual addition of 100 ml. of 5% aqueous sodium formaldehyde sulfoxylate. The resultant seed latex had a solids content of 34.6% and was post-stabilized by the addition of 60.6 grams of sodium lauryl sulfate. Average particle size of the seed latex was .035 micron.

Example 2

This example illustrates the preparation of a seed latex of polyvinyl acetate.

Using a vessel equipped with stirrer, reflux condenser and means for introducing reactants, 17 parts by weight of a 35% aqueous solution of sodium lauryl sulfate were dispersed in 84 parts of deionized water. There was then added 25 parts of vinyl acetate monomer, 0.40 part of potassium persulfate and 2.0 parts of a 2% aqueous solution of sodium bisulfite. After adjustment of pH to 5.0 with dilute sodium hydroxide, the aqueous composition was heated. When the temperature reached 55° C., 75 parts of vinyl acetate monomer and 18 parts of a 2% aqueous solution of sodium bisulfite were added gradually over a period of one hour, during which the temperature was about 62° C. After the additions were complete, the composition was heated to 72° C. and kept at 72° C. for an additional hour, yielding a seed latex having 55% solids with a particle size ranging between 0.02 and .05 micron.

Example 3

This example illustrates the preparation of a seed latex of 2-ethylhexylacrylate.

Using a reactor as in Example 1, a 140 gram portion of a 25% aqueous solution of sodium lauryl sulfate was dispersed in 4,200 ml. of distilled water. There was then added a solution of 46.5 grams ammonium persulfate in 500 ml. water.

A monomer emulsion was prepared by dispersing 3,500 grams of 2-ethylacrylate in a solution of 70 grams 25% aqueous sodium lauryl sulfate in 1,000 ml. of water.

The reactor composition was heated to 80° C. and held at that temperature while the monomer emulsion was added over a period of one hour. Tests on the latex obtained showed that conversion of monomer to polymer was substantially complete, the latex had a solids content equal to 37% and a surface tension of 56 dyne-cms. Particle size was between 0.03 and 0.06 micron.

Example 4

A high pressure reactor equipped with heating jacket and stirrer was charged with 5,277 grams of deionized water, 173 grams of the seed latex of Example 1, 150 grams sodium dodecyl benzene sulfonate, 30 grams sodium carbonate, and 1,200 grams of vinyl chloride monomer. Ethylene was then added to the reactor while heating to 60° C. at which temperature the ethylene pressure was then maintained constant at 900 p.s.i. Two simultaneous feeds were then begun, one being 2% sodium persulfate solution in water, the other being vinyl chloride monomer. At the end of 12 hours both feeds were discontinued. The total amount of persulfate solution added was 1,500 ml., while that of vinyl chloride was 4,800 grams. The reactor was maintained at 60° C. for 3 additional hours. After reducing the pressure to atmospheric the latex was removed. A coagulum-free product was obtained having 46.5% solids content. The ethylene content of the polymer was 12%. The minimum film formation temperature was found to be 34° C. When this latex was formulated into a standard paint, there was observed a ten-fold improvement in scrub resistance as compared to a conventional commercial latex of the vinyl acrylic type in the same formulation. Films of the copolymer showed excellent resistance to discoloration on exposure to heat of a 150° C. oven. Films were non-yellowing on storage.

Example 5

A reaction vessel was charged with 5,200 grams deionized water, 200 grams of a 30% solids ethylhexylacrylate seed latex made similarly as in Example 3, 30 grams of sodium carbonate, 21 grams sodium lauryl sulfate and 5.3 grams sodium persulfate. At 63° C., ethylene was added to a pressure of 1,200 p.s.i. and pressure was held constant throughout the run. Two simultaneous feeds were added over 16 hours, one being 6,000 grams vinyl chloride monomer, the other being 1,850 grams of a water solution containing 10.4% of sodium lauryl sulfate and 2.6% of sodium persulfate. The reaction was maintained at 63° C. for an additional 7 hours.

A coagulum-free latex was obtained containing 47.1% solids. The ethylene content of the recovered polymer was 17%. The latex had a minimum film formation temperature of 16° C.

The latex was found to have excellent mechanical stability and the polymer deposited from the latex had a superior heat stability being much more resistant to discoloration on exposure to heating in an oven at 150° C. for 2 hours than corresponding vinyl chloride-ethylene copolymers emulsion-polymerized by conventional redox systems.

Films coated from this latex onto paper were found to be clear, flexible, non-blocking and grease resistant. Coatings of this latex on various types of textile fabrics were found to impart good "hand" and showed good fastness to washing and excellent abrasion resistance.

Example 6

A reaction vessel was charged with:

| | G. |
|---|---|
| Water | 4,000 |
| Polyvinyl acetate seed latex made as in Example 2 and reduced to 30% solids | 150 |
| 25% aqueous solution of sodium dodecyl benzene sulfonate | 588 |
| Sodium bicarbonate | 20 |
| Sodium persulfate | 10 |
| Vinyl chloride monomer | 300 |
| Vinyl acetate monomer | 200 | at 82° C., ethylene was added to 1,200 p.s.i. and pressure was held constant throughout the run. Two simultaneous feeds were added over a period of 16 hours, namely (1) 6,000 grams of a mixture of 3,600 grams of vinyl chloride monomer and 2,400 grams of vinyl acetate, (2) 1,200 grams of a water solution containing 1.5% sodium persulfate and 2% sodium bicarbonate.

A coagulum-free latex was obtained having a solids content of 52.5% and a minimum film formation temperature of 2° C. The deposited film was glass-clear and was resistant to discoloration on heating at 150° C.

Example 7

A reaction vessel was charged with:

| | G. |
|---|---|
| Water | 5,000 |
| The seed latex of Example 3 reduced to 20% solids | 400 |
| Sodium carbonate | 30 |
| Sodium persulfate | 6 |
| Vinyl chloride monomer | 1,200 |

At 63° C., ethylene was added to 2,000 p.s.i. and the pressure was kept constant throughout the reaction. Two simultaneous feeds were added over a period of 16 hours. One of these feeds was 4,800 grams of vinyl chloride monomer, the other was 1 liter of a water solution containing 3% sodium persulfate and 2% sodium lauryl sulfate.

A coagulum-free latex was obtained of total solids 49.5%. Copolymerized ethylene was found to be 25.7%, based on weight of interpolymer. Films were water-white and non-yellowing.

Example 8

The procedure of Example 4 was followed excepting that monomer addition was extended over a period of 18 hours and reaction at 63° C. continued for 3 more hours. A stable latex containing 55.2% solids was obtained. The polymer of this latex contained 12% ethylene and was resistant to yellowing on storage, or heating at 150° C.

Example 9

A seed latex of vinyl chloride/ethylene is prepared by repeating the procedure of Example 5 with the exception that 240 grams instead of 21 grams of sodium lauryl sulfate are used.

Example 10

A series of polymerization runs is made in which the procedure of Example 5 is followed except that in each run the polyvinyl chloride seed latex is replaced by a different polymer seed latex, wherein the polymer composition comprises successively (a) 60 parts vinyl chloride and 40 parts vinyl acetate, (b) 80 parts vinyl chloride and 20 parts methyl acrylate, (c) 80 parts vinyl chloride and 20 parts isopropylacrylate, (d) vinyl chloride/ethylene using an aliquot of the seed latex of Example 9, for each of these seed latexes four separate runs are made with the amount of seed solids being respectively 0.1%, 2%, 3% and 5% based on the 6,000 grams vinyl chloride added. In each case a stable latex is obtained of an ethylene copolymer containing between about 16% and 18% ethylene and possessing excellent resistance to discoloration on storage or on exposure to heat.

Example 11

A series of polymerizations is run in which the procedure of Example 5 is followed except that in each run the sodium persulfate is replaced successively by potassium peroxydiphosphate, potassium persulfate, ammonium persulfate, sodium peroxydiphosphate and tetramethyl ammonium persulfate. In each case a stable latex is obtained of an ethylene copolymer containing between about 16% and 18% ethylene and possessing excellent resistance to discoloration on storage or on exposure to heat.

Example 12

This example illustrates the usefulness of the seed latex and procedure of adding monomer as used in the method of this invention not only as an aid to incorporating a high amount of ethylene into the copolymer but also as a means of overcoming inhibition of reaction.

In an experiment which did not follow the procedure of the instant invention, a reactor was charged with 5,500 ml. of deionized water, 588 grams of 25% aqueous solution of sodium lauryl sulfate, 10 grams sodium persulfate and 30 grams sodium carbonate. This aqueous composition was heated to 60° C. and 1,200 grams of vinyl chloride was then added to the reactor, and ethylene was charged to bring the pressure to 1,500 p.s.i. A sample taken after two hours showed no reaction to have occurred.

In a companion experiment using the procedure of the instant invention, the reactor was charged with 4,920 ml. of deionized water, 228 grams of a polymeric seed latex containing 33.7% solids, 7.8 grams of sodium persulfate and 26 grams of sodium carbonate. Again, the aqueous composition was heated to 60° C. and 1,200 grams of vinyl chloride was then added to the reactor, and ethylene gas was charged to bring the pressure to 1,500 p.s.i. A sample taken after 30 minutes showed polymerization to have begun. Continuous addition of 4,730 grams vinyl chloride was begun at this time and continued gradually at a constant rate over a 13-hour period. Over the same period there was also added 1,200 grams of an aqueous solution containing 3% of sodium persulfate and 2% of sodium lauryl sulfate. A stable latex was obtained containing 40% solids and having a minimum film formation temperature of 15° C. The ethylene content of the recovered polymer was found to be 19.7%.

It will be understood that it is intended to cover all changes and modifications of the examples of the invention herein chosen for the purpose of illustration which do not constitute departures from the spirit and scope of the invention.

What is claimed is:

1. A method of preparing by emulsion polymerization a stable latex of an interpolymer containing between about 6% and 30% of ethylene and between about 94 and 70% of comonomer including a major portion of vinyl chloride, said method comprising
   (a) maintaining ethylene pressure at between about 500 and 3,000 p.s.i. on an aqueous composition at a temperature between about 50° C. and 85° C., said aqueous composition containing a seed latex prepared by the emulsion polymerization of one or more polymerizable ethylenically unsaturated compounds, between about .04% and 5% of an anionic or nonionic surfactant, and an initiator selected from the group consisting of water-soluble persulfates and peroxydiphosphates, said initiator being maintained at a level sufficient to effect polymerization while
   (b) adding said comonomer gradually over a period of not less than about six hours.

2. The method of claim 1 wherein the seed latex has a particle size between about 0.005 and 0.10 micron and is present in an amount between about 0.01% and 10% solids based on the total amount of comonomer added to the aqueous composition.

3. The method of claim 1 wherein the surfactant is selected from the group consisting of sodium lauryl sulfate and sodium dodecyl benzene sulfonate.

4. The method of claim 1 wherein all the comonomer is vinyl chloride.

5. The method of claim 1 wherein the minor proportion of comonomer is selected from the group consisting of vinyl acetate, vinyl propionate, vinylidene chloride, propylene, butene, and esters of acrylic or methacrylic acid with alkanols containing up to 10 carbon atoms in the alkyl group.

6. A method of preparing by emulsion polymerization a stable latex of a copolymer containing between about 70%–94% of vinyl chloride and correspondingly 30%–6% ethylene, said method comprising
   (a) maintaining ethylene pressure at between about 500 and 3,000 p.s.i. on an aqueous composition at a temperature between about 50° C. and 85° C., said aqueous composition containing a seed latex prepared by the emulsion polymerization of one or more polymerizable ethylenically unsaturated compounds, between about 0.04% and 5% of an anionic or nonionic surfactant and an initiator selected from the group consisting of water-soluble persulfates and peroxydiphosphates, said initiator being maintained at a level sufficient to effect polymerization while
   (b) adding vinyl chloride monomer gradually over a period of not less than about six hours.

7. A method of preparing by emulsion polymerization a latex containing between about 40% and 66% solids of a vinyl chloride/ethylene copolymer comprising about 17%–20% by weight ethylene, said method comprising the steps of
   (a) maintaining substantially constant ethylene pressure at between about 1,200 and 1,500 p.s.i. on an aqueous composition at a temperature of about 55° C.–70° C., said composition comprising between about 0.5% and 2.0% of an anionic surfactant and between about 0.5% and 3.0% of a polyvinyl chloride or poly (2-ethyl hexyl acrylate) seed latex,
   (b) adding gradually thereto at a substantially constant rate, over a period of between about 12–16 hours, an aqueous solution of sodium or potassium persulfate, in an amount between about .2% and 2% based on weight of the aqueous composition, to effect polymerization while
   (c) simultaneously adding gradually over the same period an amount of vinyl chloride in about 5%–20% excess over the theoretical amount needed to obtain the expected solids, and
   (d) maintaining the polymerizing system at 55° C.–70° C. until the required solids is obtained.

8. A method of preparing by emulsion polymerization a latex of a terpolymer of vinyl chloride, vinyl acetate and ethylene which comprises maintaining ethylene pressure at between about 500 p.s.i. and 3,000 p.s.i. on an aqueous composition at a temperature between about 50° C. and 85° C., said aqueous composition containing a seed latex prepared by the emulsion polymerization of one or more polymerizable ethylenically unsaturated compounds, and between about 0.04% and 5% of an anionic or nonionic surfactant, adding gradually thereto over a period of between about 6 and 24 hours an aqueous solution of a water-soluble alkali metal persulfate or peroxydiphosphate to effect polymerization while simultaneously adding over the same period both vinyl chloride and vinyl acetate in the weight proportions between about 51/49 and 99/1.

9. A stable latex having a solids content between about 40% and 66%, made by a method of claim 1 wherein the aqueous composition contains at least 0.5% of an anionic or nonionic surfactant.

10. A stable latex having a solids content of about 40% to 66% of a vinyl chloride/ethylene copolymer containing about 17%–20% ethylene, made by an emulsion polymerization method comprising the steps of
  (a) maintaining substantially constant ethylene pressure at between about 1,200 and 1,500 p.s.i. on an aqueous composition at a temperature of about 55° C.–70° C., said composition comprising between about 0.5% and 2.0% of an anionic surfactant and between about 0.5% and 3.0% of a poly(2-ethyl hexyl acrylate) seed latex,
  (b) adding gradually thereto at a substantially constant rate, over a period of between about 12–16 hours, an aqueous solution of a water-soluble alkali metal persulfate or peroxydiphosphate, in an amount between about .2% and 2% based on weight of the aqueous composition, to effect polymerization while
  (c) simultaneously adding gradually over the same period an amount of vinyl chloride in about 5%–20% excess over the theoretical amount needed to obtain the expected solids, and
  (d) maintaining the polymerizing system at 55° C.–70° C. until the required solids is obtained.

References Cited

UNITED STATES PATENTS

| | | | |
|---|---|---|---|
| 3,019,208 | 1/1962 | Reid et al. | 260—45.5 |
| 3,332,918 | 7/1967 | Benetta et al. | 260—85.5 |
| 3,370,028 | 2/1968 | DeWald | 260—23 |
| 3,468,840 | 9/1969 | Heiberger et al. | 260—41 |
| 3,501,440 | 3/1970 | Kamio et al. | 260—77.5 |
| 3,546,154 | 12/1970 | Hwa et al. | 260—29.6 |
| 3,548,034 | 12/1970 | Cleeman et al. | 260—884 |

FOREIGN PATENTS 1,180,322    2/1970    Great Britain.

WILLIAM H. SHORT, Primary Examiner

E. A. NIELSEN, Assistant Examiner

U.S. Cl. X.R.

260—8, 17 R, 17.4 ST, 29.6 RW, 29.6 WA, T, 87.5 C, 878 R

UNITED STATES PATENT OFFICE
CERTIFICATE OF CORRECTION

Patent No. 3,689,447  Dated September 5, 1972

Inventor(s) Samuel J. Makower et al.

It is certified that error appears in the above-identified patent and that said Letters Patent are hereby corrected as shown below:

Column 1, line 7, after "19047" insert -- assignors to Borden, Inc., New York, N. Y., a corporation of New Jersey --.

Signed and sealed this 10th day of April 1973.

(SEAL)
Attest:

EDWARD M. FLETCHER, JR.
Attesting Officer

ROBERT GOTTSCHALK
Commissioner of Patents